(12) United States Patent
Uhr et al.

(10) Patent No.: US 12,212,692 B2
(45) Date of Patent: *Jan. 28, 2025

(54) TAMPERING VERIFICATION SYSTEM AND METHOD FOR FINANCIAL INSTITUTION CERTIFICATES, BASED ON BLOCKCHAIN

(71) Applicant: CPLABS, INC., Seongnam-si (KR)

(72) Inventors: Joon Sun Uhr, Gyeonggi-do (KR); Jay Wu Hong, Seoul (KR); Joo Han Song, Gyeonggi-do (KR)

(73) Assignee: CPLABS, INC., Seongnam-si (KR)

( * ) Notice: Subject to any disclaimer, the term of this patent is extended or adjusted under 35 U.S.C. 154(b) by 216 days.

This patent is subject to a terminal disclaimer.

(21) Appl. No.: 17/226,175

(22) Filed: Apr. 9, 2021

(65) Prior Publication Data

US 2021/0226804 A1 Jul. 22, 2021

Related U.S. Application Data

(63) Continuation of application No. 16/050,840, filed on Jul. 31, 2018, now Pat. No. 11,005,666, which is a (Continued)

(30) Foreign Application Priority Data

Feb. 22, 2016 (KR) .................. 10-2016-0020437

(51) Int. Cl.
*H04L 9/32* (2006.01)
*G06Q 20/38* (2012.01)
(Continued)

(52) U.S. Cl.
CPC ..... *H04L 9/3268* (2013.01); *G06Q 20/38215* (2013.01); *G06Q 20/4016* (2013.01);
(Continued)

(58) Field of Classification Search
CPC ....... H04L 9/50; H04L 9/3236; H04L 9/3263; H04L 9/3265; H04L 9/3268;
(Continued)

(56) References Cited

U.S. PATENT DOCUMENTS 9,705,851 B2 * 7/2017 Kaliski, Jr. ......... H04L 61/4511
9,849,364 B2 * 12/2017 Tran ...................... G16H 50/20
(Continued)

FOREIGN PATENT DOCUMENTS

KR 10-1149695 B1 5/2012
KR 10-2012-0074817 A 7/2012

OTHER PUBLICATIONS

International Search Report and Written Opinion for PCT/KR2016/011288 dated Jan. 10, 2017.
(Continued)

*Primary Examiner* — Zachary A. Davis
(74) *Attorney, Agent, or Firm* — XSENSUS LLP

(57) ABSTRACT

A tampering verification system and method for financial institution certificates are based on blockchain and verify whether one of the financial institution certificates has been tampered with by comparing the contents of the financial institution certificate at the point of first being generated by a financial institution and at the point of client issue.

6 Claims, 10 Drawing Sheets

Related U.S. Application Data continuation of application No. PCT/KR2016/011288, filed on Oct. 10, 2016.

(51) Int. Cl.
  *G06Q 20/40*   (2012.01)
  *G06Q 40/02*   (2023.01)
  *H04L 9/06*    (2006.01)
  *H04L 9/40*    (2022.01)
  *H04L 9/00*    (2022.01)

(52) U.S. Cl.
  CPC .......... *G06Q 40/02* (2013.01); *H04L 9/0637* (2013.01); *H04L 9/3236* (2013.01); *H04L 9/3265* (2013.01); *H04L 63/12* (2013.01); *H04L 63/1483* (2013.01); *G06Q 2220/00* (2013.01); *H04L 9/50* (2022.05); *H04L 2209/56* (2013.01)

(58) Field of Classification Search
  CPC . H04L 2209/38; H04L 2209/56; G06Q 20/06; G06Q 20/36
  See application file for complete search history.

(56) References Cited

U.S. PATENT DOCUMENTS

| | | | | |
|---|---|---|---|---|
| 10,157,295 | B2* | 12/2018 | Barinov | ................ H04L 9/3236 |
| 11,005,666 | B2* | 5/2021 | Uhr | .................... G06Q 20/4016 |
| 2015/0206106 | A1 | 7/2015 | Yago | |
| 2018/0343128 | A1* | 11/2018 | Uhr | ........................ H04L 9/3236 |

OTHER PUBLICATIONS

Khatwani, Sudhir, "What is Bitcoin Hash?", SHA-256 (developed in 2001 by NSA, https://coinsutra.com/bitcoin-hash/ Jul. 27, 2017, 10 pp.

Bradbury, Danny, "Scrypt-based miners and the new cryptocurrency arms race", https://www.coindesk.com/scrypt-miners-cryptocurrency-arms-race/ Oct. 24, 2013, 11 pp.

Dhariwal, Kunal, "Cryptocurrency Mining Algorithms and Popular Cryptocurrencies", https://medium.com/@Mr.dhariwal/cryptocurrency-mining-algorithms-and-popular-cryptocurrencies-48176d3559d6, Mar. 3, 2018, 6 pp.

"Merkle tree",https://en.wikipedia.org/w/index.php?title=Merkle_tree&oldid=841347789, May 15, 2018, 4 pp.

* cited by examiner

TAMPERING VERIFICATION SYSTEM AND METHOD FOR FINANCIAL INSTITUTION CERTIFICATES, BASED ON BLOCKCHAIN

CROSS-REFERENCE TO RELATED APPLICATIONS

This application is a continuation of U.S. application Ser. No. 16/050,840 (now U.S. Pat. No. 11,005,666), filed Jul. 31, 2018, which is based on PCT filing PCT/KR2016/011288 filed on Oct. 10, 2016, which claims priority to Korean Patent Application No. 10-2016-0020437 filed Feb. 22, 2016, each of which is hereby expressly incorporated by reference into the present application.

FIELD OF THE INVENTION

The present invention relates to a system for verifying whether a certificate of a financial institution (FI) is forged or not based on a blockchain; and more particularly, to the system of an FI terminal, an authentication-managing server, blockchain nodes, and a client device, and the method using the same.

BACKGROUND OF THE INVENTION

As financial transaction methods and channels diversify and information related to financial transactions are used in various fields, numerous certificates like a certificate of deposit balance, a debt certificate, a bank guarantee, a transaction history, a financial information statement, a letter of credit, etc. are frequently issued from financial institutions.

However, clients have to go to an actual place and request the certificates, which is cumbersome and time-consuming.

A conventional electronic certificate issuing system (patent 1) to resolve this problem is comprised of a means of receiving information on a requested certificate including a type, a purpose, a client, a means of extracting at least one piece of certificate information corresponding to the information on the requested certificate from a certain ledger or a database, a means of creating and storing an electronic document including the certificate information in an electronic document vault, and a means of issuing the certificate by transmitting the electronic certificate stored in the vault to a terminal.

Using this system, the client may receive the certificates in real-time using the terminal at a remote place without physical access to a financial institution.

In general, a seal, an embossed seal, or a stamp, etc. of a financial institution's head officer is used to prove that an issued certificate is not forged.

Clearly, the conventional electronic certificate issuing system cannot provide an official seal like the seal, the embossed seal, or the stamp, etc. that can determine whether the issued certificate is authentic or forged.

However, this problem was resolved by a document issuing and authenticating system utilizing a conventional watermarking technology (patent 2).

In detail, the document issuing and authenticating system utilizing the conventional watermarking technology offers services that can issue an online certificate with an embedded watermark, and an institution or a company verifies integrity and authenticity of the online certificate submitted from a customer by extracting the watermark embedded in the certificate using a watermark extracting algorithm.

However, in case of the document issuing and authenticating system utilizing the conventional watermarking technology, forgery of documents is determined only by a fact whether the watermark is embedded into the certificate. Therefore, if the watermark is embedded after the issued certificate is forged, then this forged certificate is recognized as an authentic certificate. In turn, this poses a problem that renders the system useless.

Such a problem of the certificate being verified as authentic when the watermark is embedded after the forgery, is resolved by a patent No. 3 in which a method for verifying financial institution certificate based on a blockchain and the system using the same is provided.

That is, the conventional method for verifying financial institution certificate based on the blockchain and the system using the same has an effect of accurately verifying authenticity of the certificate issued from the financial institution by comparing the certificate for client initially issued from the financial institution and the certificate re-issued later at the request of the client, without regard to whether its watermark is verified or not.

Despite these advantages, the conventional financial certificate verification method based on the blockchain and the system using the same requires an initial cost of issuance for storing and managing of the certificate for client in the blockchain nodes.

The initial cost is about 0.0001 bitcoin, and as of July 2014, 0.0001 bitcoin amounts to about mere 4 cents, however, this cost is charged every time the certificate for the client is stored in the blockchain, thus this becomes a problem as the cost of the issuance increases in proportion to the increase of the number (quantity expressed as a cardinal number) of certificates for the client.

Additionally, the conventional certificate verification method and the system using the same registers, stores, and manages the certificate for the client in more than 0.1 million blockchain nodes to prevent forgery.

That is, the broadcast of the transaction information including the certificate for client is defined by a protocol, and if the transaction information including the public key occurs, one node, i.e., a blockchain node, broadcasts initial transaction information including the public key to eight designated nodes, then each of the eight designated nodes that received the information broadcasts again to another eight designated nodes in a pyramidic fashion, and the broadcast is completed when the information is transmitted to all of the blockchain nodes which have the digital wallets containing the blockchain required for bitcoin transfer.

Thus, the conventional certificate verification method based on the blockchain and the system using the same has a problem of network overload due to heavy traffic of transaction information including the certificate for the client when requests for registration of certificates are flooding in.

PRIOR ART

Patent Literature

Patent Literature 1: Korean Patent Laid-Open Publication No. 10-2009-0000740 published on Jan. 8, 2009
Patent Literature 2: Korean Patent Laid-Open Publication No. 10-2003-0020675 published on Mar. 10, 2003
Patent Literature 3: Korean Patent Application No. 10-2015-0086457 filed on Jun. 18, 2015

SUMMARY OF THE INVENTION

It is an object of the present invention to solve all the aforementioned problems. It is another object of the present invention to provide a certificate verification method based on a blockchain and a system using the same, which verifies whether a certificate issued by financial institutions is forged or not without a need for watermarks which may also have been forged, reduces costs for registration of the certificates for client based on the blockchain, by comparing a certificate at the time of an initial issuance and a certificate of the same contents issued later at the client's request.

It is still another object of the present invention to provide the certificate verification method based on the blockchain and the system using the same, which minimizes network overload by reducing network traffic through a means for registering information on the certificate which is grouped and compressed by a system administrator in the blockchain.

In accordance with one aspect of the present disclosure, there is provided a method for verifying whether a certificate of a financial institution (FI) is forged or not based on a blockchain, including steps of: receiving, by an authentication-managing server, a request for recording a certificate including the certificate and client identification information from an FI terminal; performing, by the authentication-managing server, operations of storing a pair of the certificate and the client identification information in a certificate database (DB), generating specific node hash information for registration by hashing the pair, and storing the specific node hash information for registration in the certificate DB; confirming, by the authentication-managing server, whether an anchoring condition is met; performing, by the authentication-managing server, under a condition that the anchoring condition is met, operations of retrieving from the certificate DB a predetermined quantity of pieces of node hash information including the specific node hash information for registration, the predetermined quantity being expressed as a predetermined cardinal number, wherein the predetermined quantity is determined by the anchoring condition, and generating specific root hash information for registration by using a specific Merkle tree including the predetermined quantity of pieces of node hash information; performing, by the authentication-managing server, operations of generating specific transaction information including the specific root hash information for registration, generating a specific transaction ID to be used as a key value for searching for the specific transaction information, and transmitting the transaction information to blockchain nodes as an instruction to the blockchain nodes to store the transaction information in a blockchain ledger so as to establish an authenticity of a registration of the certificate; transmitting, by the authentication-managing server, the specific transaction ID to the FI terminal; receiving, by the authentication-managing server, a request for verifying the certificate including the certificate, the specific transaction ID and the client identification information from a client device, the receiving being in response to the client device having sent a request for the certificate to the FI terminal and having received the certificate and the specific transaction ID from the FI terminal; and performing, by the authentication-managing server, processes of (i) generating specific node hash information for comparison by hashing the certificate and the client identification information received from the client device, (ii) generating verification-related information which represents whether the specific node hash information for comparison is identical to the specific node hash information for registration, and (iii) transmitting the verification-related information to the client device.

As one example, the anchoring condition includes at least one of (i) a numeric condition of determining whether the specific Merkle tree includes the predetermined quantity of said pieces of node hash information, and (ii) a temporal condition of determining whether a predetermined amount of time has elapsed since a last anchoring condition was met.

As one example, after confirming whether the anchoring condition is met, by the authentication-managing server, the method further includes: performing, by the authentication-managing server, under the condition that the anchoring condition is met, extracting any previous transaction IDs that have been stored in a verification DB, and transmitting each of the any previous transaction IDs to the blockchain nodes as an instruction to the blockchain nodes to (i) extract pieces of previous root hash information for registration included in pieces of previous transaction information wherein the pieces of the previous transaction information are retrieved from the blockchain ledger by referring to each of the any previous transaction IDs and (ii) transmit the pieces of previous root hash information for registration to the authentication-managing server; receiving, by the authentication-managing server, the pieces of previous root hash information for registration, and grouping pieces of previous node hash information for comparison with the pieces of the previous root hash information for registration, wherein the pieces of previous node hash information for comparison have been stored in the certificate DB, so as to group the pieces of previous node hash information for comparison into a plurality of sets whose size is determined by the anchoring condition, so as to generate pieces of previous root hash information for comparison by using the specific Merkle tree including the pieces of previous node hash information for comparison included in each of said plurality of sets; and performing, by the authentication-managing server, processes of (i) pairing each of the pieces of the previous root hash information for registration and each of the pieces of previous root hash information for comparison according to generated sequences of each of the pieces of the previous root hash information for registration and each of the pieces of previous root hash information for comparison, and (ii) confirming that said each of the pieces of previous root hash information for registration is identical pair-wise to said each of the pieces of previous root hash information for comparison, to thereby complete a verification of whether the certificate stored in the authentication-managing server is forged or not.

As one example, the authentication-managing server further inserts the specific root hash information for registration in an Operation Code RETURN area of the specific transaction information and transmit the specific transaction information, and wherein the Operation Code RETURN represents that its transaction information is not a monetary transaction related to a cryptocurrency payment.

As one example, the blockchain nodes, under a condition that the Operation Code RETURN area of the specific transaction information transmitted from the authentication-managing server is determined to have the specific root hash information for registration, allow the specific transaction information to be stored in the blockchain ledger.

As one example, the generating the verification-related information includes processes of: transmitting, by the authentication-managing server, under a condition that the certificate and the specific transaction ID are received, the specific transaction ID to the blockchain nodes [[,]] as an instruction to the blockchain nodes to (i) retrieve the specific transaction information from the blockchain ledger by referring to the specific transaction ID and (ii) transmit the specific transaction information to the authentication-managing server; and performing, by the authentication-managing server, processes of (i) generating the specific node hash information for comparison by hashing a data group comprised of the client identification information and the certificate transmitted from the client device, (ii) comparing the specific node hash information for registration included in the specific transaction information transmitted from the blockchain nodes and the specific node hash information for comparison, and (iii) creating the verification-related information representing whether the specific node hash information for registration and the specific node hash information for comparison are identical to each other and indicative that the certificate is forged if the two pieces of respective specific node hash information are not identical to each other.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The embodiments below of the present invention will be described in sufficient detail by referring to attached drawings regarding configurations and effects of the embodiments.

Figure 1:
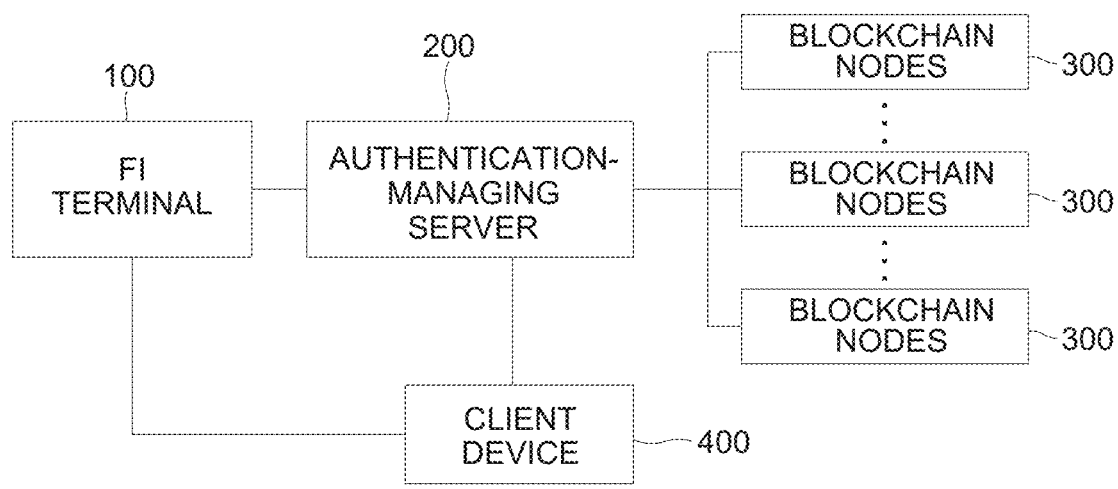
FIG. 1 is a configurational diagram illustrating a system for verifying whether a certificate of a financial institution (FI) based on a blockchain is forged or not in accordance with the present invention.
Figure 2:
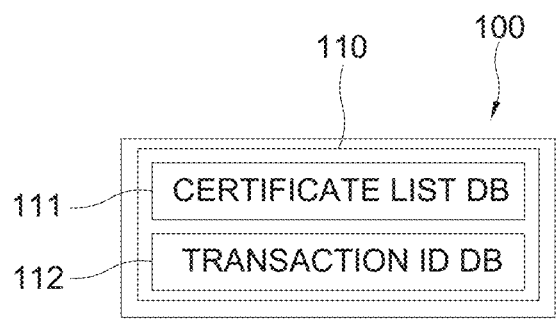
FIG. 2 is a block diagram illustrating an FI terminal of the system for verifying whether the certificate is forged or not based on the blockchain in accordance with the present invention.
Figure 3:
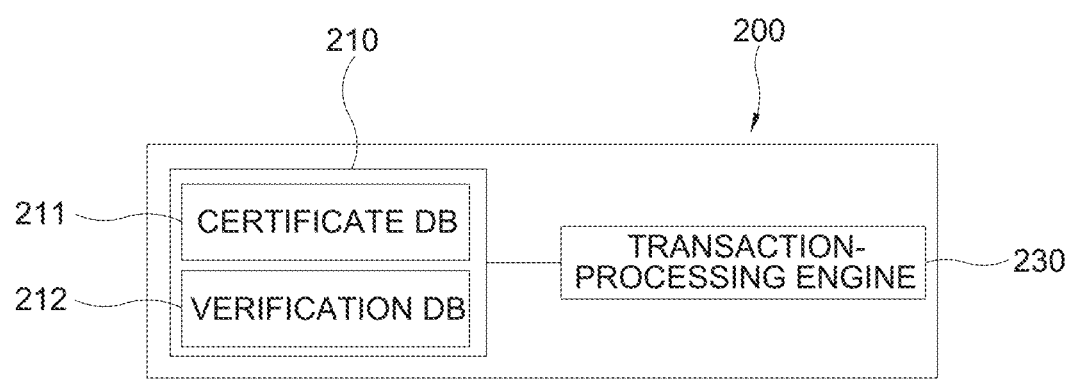
FIG. 3 is a block diagram illustrating an authentication-managing server of the system for verifying whether the certificate is forged or not based on the blockchain in accordance with the present invention.
Figure 4:
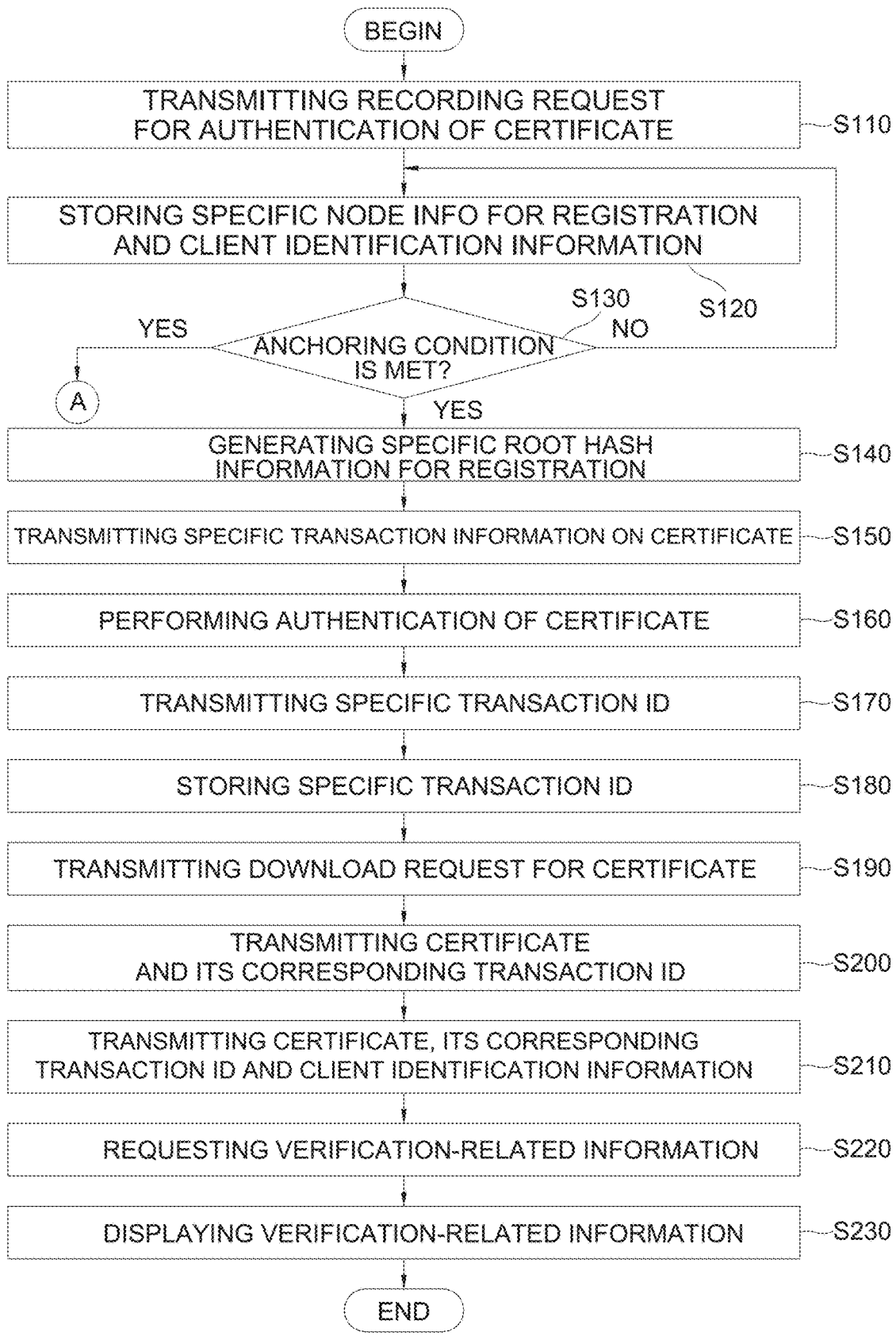
FIGS. 4 to 6 are flow charts illustrating a process of verifying whether the certificate issued from the financial institution is forged or not by using the system for verifying whether the certificate is forged or not based on the blockchain in accordance with the present invention.
Figure 5:
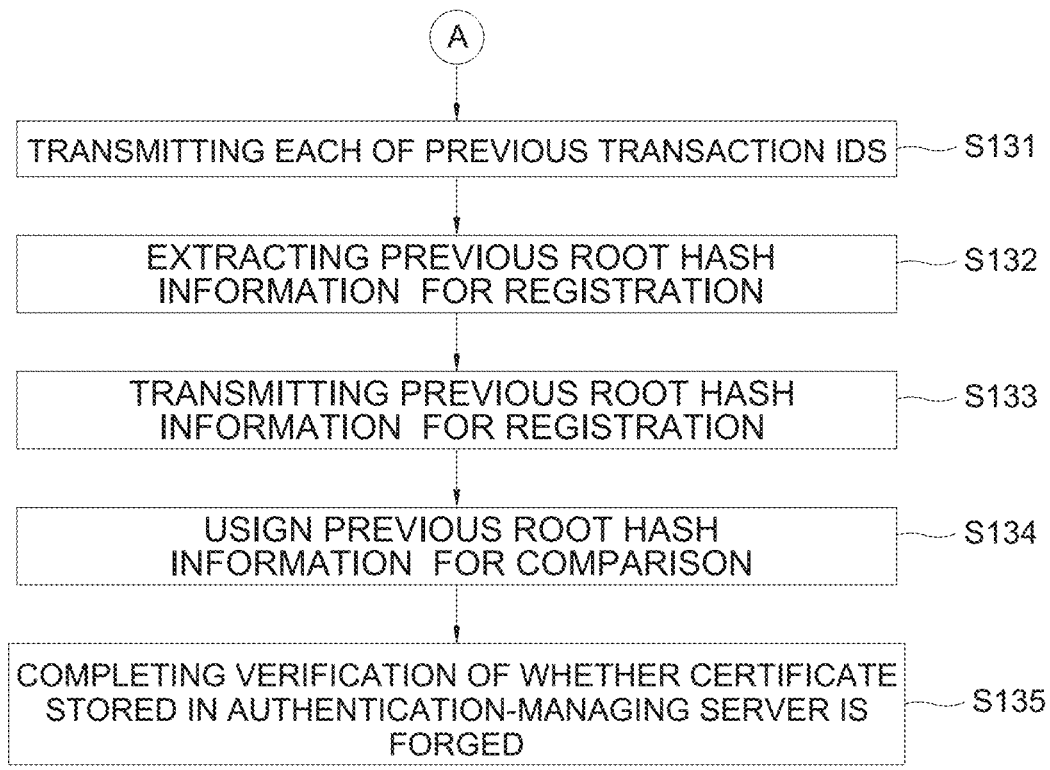
Figure 6:
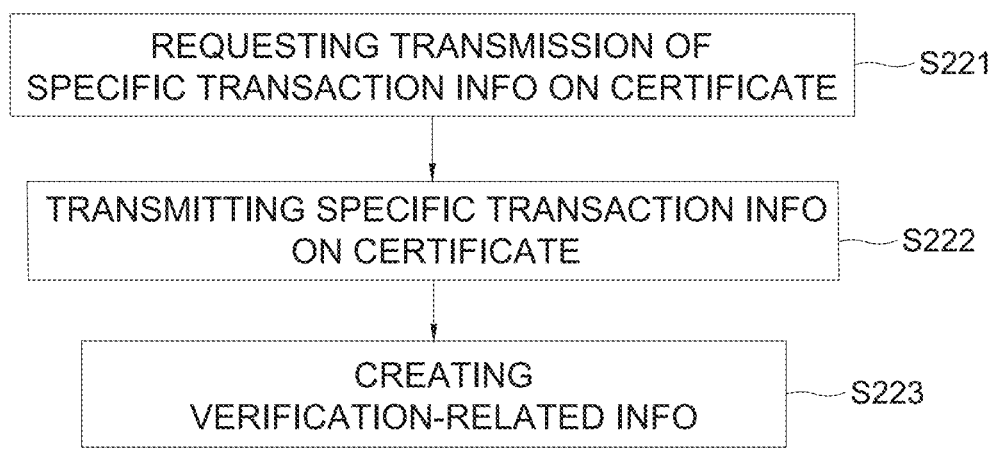

FIG. 1 is a configurational diagram illustrating a system for verifying whether a certificate of a financial institution (FI) is forged or not based on a blockchain in accordance with the present invention, FIG. 2 is a block diagram illustrating an FI terminal of the system for verifying the certificate based on the blockchain in accordance with the present invention, FIG. 3 is a block diagram illustrating an authentication-managing server of the system for verifying the certificate based on the blockchain in accordance with the present invention, and FIGS. 4 to 6 are flow charts illustrating a process of verifying whether the certificate issued from the financial institution is forged or not by using the system for verifying the certificate based on the blockchain in accordance with the present invention.

As illustrated, the system for verifying the certificate based on the blockchain in accordance with the present invention may include the FI terminal 100, the authentication-managing server 200, blockchain nodes 300, and a client device 400.

First of all, the FI terminal 100 may be a terminal operated by a bank, a fiduciary institution, an insurance company, and a securities company that accepts and manages deposits, and makes loans to other companies or persons, or invests in stocks, etc. The FI terminal 100 may (i) request an authentication of the certificate which may further include information on the certificate, when the certificate is initially issued from the financial institution to a client, (ii) store a specific transaction ID transmitted in response to the request for the authentication, and (iii) if a download request for the certificate is received, transmit the certificate and its corresponding specific transaction ID.

For this purpose, the FI terminal 100 may include a database (DB) part 110.

Specifically, the DB part 110 may include a certificate list DB 111 that stores client identification information and the certificate which is to be provided to clients by financial institutions, and a transaction ID DB 112 that stores transaction IDs used as key values to search transaction information.

The blockchain nodes 300 may be devices composing a cryptocurrency network that performs cryptocurrency transfer by verifying and storing the transfer.

Herein, as an example of the cryptocurrency, the bitcoin is briefly explained. Bitcoin is a digital currency capable of payment for goods made by Satoshi Nakamoto in 2009, and has a decentralized structure which does not have a central device that issues and manages the currency. Rather, the transactions of bitcoin are processed by a distributed network based on a peer-to-peer, i.e., P2P, network and public key encryption.

Having a payment method as such, the bitcoin has advantages that payment is possible without required information used for credit card transactions such as card numbers, expiration dates, and CCV numbers, and that fees are inexpensive. Further, bitcoin is stored in a digital wallet which is an electronic file, and a unique address, i.e., a public address, is allocated to this digital wallet, and the bitcoin transactions are processed based on the unique addresses.

In order to use bitcoin having such transactional characteristics, first of all, a bitcoin user may sign in to a bitcoin exchange, e.g., www.coinplug.com, and make a digital wallet then load it with KRW, i.e., Korean Won.

Thereafter, after confirming a current exchange rate of bitcoin at the exchange, the bitcoin user may place a buying order including an amount and a unit price of bitcoin. If a selling order matching the buying order exists, then a transaction occurs and the bitcoin user may pay with bitcoin for a product.

The blockchain nodes 300 may, as aforementioned, include one or more servers operated by the bitcoin exchange.

For this purpose, the respective blockchain nodes 300 may include digital wallets, and if transaction information for bitcoin transfer created by the digital wallets according to a typical bitcoin transfer is received, the blockchain nodes 300 may verify the received transaction information for bitcoin transfer to thereby authenticate the bitcoin transfer, and then the transaction information for bitcoin transfer may be recorded and broadcast to designated ones of the blockchain nodes 300.

That is, the broadcast protocol of the transaction information for bitcoin transfer is defined, and if the transaction information for bitcoin transfer occurs, a single node broadcasts initial transaction information for bitcoin transfer to eight designated nodes, then each of the eight designated nodes that received the information broadcasts again to another eight designated nodes in a pyramidic fashion, and the broadcast is completed when the information is transmitted to all of the blockchain nodes 300 in the blockchain required for bitcoin transfer.

Therefore, any information recorded on the blockchain including the transaction information for bitcoin transfer cannot be tampered with.

Meanwhile, the blockchain nodes 300 may include a server or a terminal operated by a bitcoin miner, or a user's terminal for bitcoin transfer, e.g., a PC or a smart phone.

In case of the bitcoin transfer, the transfer is based on the digital wallet containing the blockchain, and transfer methods based on the digital wallet containing the blockchain may also include Litecoin, DarkCoin, Namecoin, Dogecoin, and Ripple, and these may be used instead of bitcoin when verifying whether the certificate is forged or not, in accordance with the present invention.

Further, the blockchain of the blockchain nodes 300 may include personal transaction information as well as the transaction information for cryptocurrency payment. That is, the transaction information may also be recorded which includes node hash information generated by hashing a data group comprised of the certificate and the client identification information.

That is, if the transaction information for cryptocurrency transfer is transmitted, which includes an Operation Code [RETURN] where the node hash information is embedded, then each of the respective blockchain nodes 300 broadcasts the transaction information as personal transaction information, not as information representing a cryptocurrency payment, and the inclusion of the transaction information into the Operation Code [RETURN] plays a major role in determining authenticity of digital contents, i.e., whether the digital contents are forged or not.

Herein, if the blockchain nodes 300 detect a certain message within the Operation Code [RETURN] included in the transaction information for cryptocurrency transfer when authenticating the cryptocurrency transfer, the blockchain nodes 300 may send a notification that the information including the certain message is used to represent an arbitrary data, not transaction information for cryptocurrency payment.

In response to a recording request from the FI terminal 100, the authentication-managing server 200 may (i) generate specific node hash information for registration by using the certificate and the client identification information, (ii) store the specific node hash information for registration in a certificate DB 211, and (iii) if one of anchoring conditions is met, retrieve from the certificate DB 211 a predetermined cardinal number of pieces of node hash information included in a specific Merkle tree having the specific node hash information for registration, where the predetermined cardinal number is determined by said one of the anchoring conditions, (iv) generate specific root hash information for registration by using the specific Merkle tree, (v) instruct its transaction-processing engine 230 to generate specific transaction information including the specific root hash information for registration and a specific transaction ID to be used as a key value for searching for the specific transaction information, (vi) transmit the specific transaction ID to the FI terminal 100, and (vii) transmit, for the authentication, the specific transaction information.

For this purpose, the authentication-managing server 200 may include its transaction-processing engine 230 and its DB part 210.

The DB part 210 may be a storage device where information required for the authentication of the certificate is stored, and may include its certificate DB 211 and its verification DB 212.

The certificate DB 211 may store the certificate and the client identification information, and may cumulatively store node hash information and root hash information for registration, etc.

The verification DB 212 may cumulatively store pieces of transaction information and their corresponding transaction IDs.

The transaction-processing engine 230, which is operated by the authentication-managing server 200, may (i) generate the specific transaction information by inserting the node hash information into the Operation Code [RETURN] area which indicates personal transaction information, not a cryptocurrency payment, (ii) allow the specific transaction information to be stored in the verification DB 212, (iii) generate and store the specific transaction ID in the verification DB 212, which is to be used as a key value for searching for the specific transaction information, (iv) transmit the specific transaction ID to the FI terminal 100, and (v) transmit the specific transaction information to the blockchain nodes 300, for the authentication.

Herein, the authentication-managing server 200 may include the digital wallet if the authentication-managing server 200 performs a function of bitcoin transaction.

Herein, the authentication-managing server 200 does not send right away the specific transaction information to the blockchain nodes 300 for the authentication. Instead, if the authentication-managing server 200 inputs the specific transaction information into its blockchain database, the authentication-managing server 200 may (i) read the specific transaction information, (ii) if certain information is detected in the Operation Code [RETURN], omit a process of authenticating a cryptocurrency payment and store the specific transaction information including the specific node hash information in the blockchain to thereby complete the authentication, and (iii) transmit the transaction information to designated nodes of the blockchain nodes 300, for broadcasting.

Therefore, if the certificate and the specific transaction ID are transmitted from the client device 400 to be described later, information identical to the specific node hash information in the specific transaction information stored in another of the blockchain nodes 300 may be acquired from the blockchain database of the authentication-managing server 200 by referring to the specific transaction ID, without sending the specific transaction ID to the blockchain nodes 300.

One of the anchoring conditions is used for grouping a cardinal number of pieces of transaction information included in a process of registering the certificate in the blockchain, which enables compressing and processing the certificate, thus the network traffic may be minimized and the network overload may be reduced. Herein, the cardinal number is predetermined by a system administrator.

Such anchoring conditions may vary, and may be a predetermined cardinal number of pieces of node hash information, or may be a predetermined amount of time lapse.

The authentication-managing server 200 may determine whether the certificate is forged or not, based on the certificate, the specific transaction ID, and the client identification information transmitted from the client device 400 to be described later, and may generate verification-related information on the certificate which represents the determined authenticity, i.e., whether the certificate is forged or not.

For this purpose, if the certificate and the specific transaction ID are received from the client device 400 to be described later, the authentication-managing server 200 may transmit the specific transaction ID to the blockchain nodes 300 to thereby request a transmission of the specific transaction information. Herein, the blockchain nodes 300 may be pre-designated ones of the blockchain nodes 300.

The blockchain nodes 300 may acquire the specific transaction information from the blockchain by referring to the specific transaction ID, and may transmit the specific transaction information to the authentication-managing server 200.

The authentication-managing server 200 may (i) generate specific node hash information for comparison by hashing a data group comprised of the client identification information and the certificate transmitted from the client device 400, (ii) compare (ii-1) the specific node hash information for registration included in the specific transaction information transmitted from the blockchain nodes 300 and (ii-2) the specific node hash information for comparison, and (iii) generate verification-related information representing whether the two pieces of respective specific node hash information at the step (ii) are identical to each other.

Also, the authentication-managing server 200 may monitor possible forgery of the certificate caused by illegal activities like hacking, by periodically verifying whether the certificate stored in the financial institutions is forged or not.

If said one of the anchoring conditions is met, the authentication-managing server 200 may extract all of previous transaction IDs that have been cumulatively stored in the verification DB 212 before said one of the anchoring conditions is met, and may transmit each of the previous transaction IDs to the blockchain nodes 300.

The blockchain nodes 300 may retrieve pieces of previous root hash information for registration included in pieces of previous transaction information retrieved from the blockchain by referring to said each of the previous transaction IDs, and transmit the pieces of previous root hash information for registration to the authentication-managing server 200.

The authentication-managing server 200 may (i) receive the pieces of previous root hash information for registration, (ii) group pieces of previous node hash information for comparison that have been stored in the certificate DB 211 into a plurality of sets of previous node hash information whose size is determined by said one of the anchoring conditions, to thereby generate pieces of previous root hash information for comparison by using the specific Merkle tree including the pieces of previous node hash information for comparison, the pieces of previous node hash information for comparison being included in each of the plurality of sets of previous node hash information, (iii) pair each of the pieces of the previous root hash information for registration and each of the pieces of previous root hash information for comparison following their generation sequence, and (iv) confirm that said each of the pieces of previous root hash information for registration is identical pair-wise to said each of the pieces of previous root hash information for comparison, to thereby complete a verification of whether the certificate stored in the authentication-managing server 200 is forged or not.

By this process, if forgery is detected through the verification, the authentication-managing server 200 may transmit a notification that the forgery of the certificate has occurred to the financial institution to allow a quick response.

The client device 400 may (i) transmit the download request for the certificate to the FI terminal 100, (ii) transmit the certificate and the specific transaction ID, received from the FI terminal 100 in response to the download request, to the authentication-managing server 200, (iii) request the verification of the authenticity of the certificate, and (iv) display the verification result sent from the authentication-managing server 200 through its screen for viewing of the client.

The description of processes of verifying the authenticity of the certificate issued by the financial institution using the system for verifying whether the certificate of the financial institution is forged or not based on the blockchain in accordance with the present invention is as follows:

First, if the certificate is created, the FI terminal 100 may store the certificate in the certificate list DB 111, transmit the certificate and the client identification information to the authentication-managing server 200, to thereby request the verification of authentication of the certificate, at a step of S110.

The authentication-managing server 200 may store the transmitted certificate and the transmitted client identification information in the certificate DB 211, may generate specific node hash information for registration by hashing a data group comprised of the transmitted certificate and the transmitted client identification information, and may cumulatively store the specific node hash information for registration in the certificate DB 211, at a step of S120.

The authentication-managing server 200 may repeat confirming of whether any of the anchoring conditions is met, at a step of S130, and if one of the anchoring conditions is met, may perform two processes.

First, for the purpose of monitoring whether the certificates stored in the financial institutions are forged by illegal activities like hacking, if said one of the anchoring conditions is met, the authentication-managing server 200 may extract all of previous transaction IDs that have been stored in the verification DB 212 before said one of the anchoring conditions is met, and may transmit each of the previous transaction IDs to the blockchain nodes 300, at a step of S131.

The blockchain nodes 300 may extract pieces of previous root hash information for registration included in pieces of previous transaction information which are retrieved from the blockchain by referring to said each of the previous transaction IDs, at a step of S132.

The blockchain nodes 300 may transmit the pieces of previous root hash information for registration to the authentication-managing server 200, at a step of S133.

The authentication-managing server 200 may receive the pieces of previous root hash information for registration, may group pieces of previous node hash information for comparison, that have been stored in the certificate DB 211 before said one of the anchoring conditions is met, into a plurality of sets of previous node hash information whose size is determined by said one of the anchoring conditions, to thereby generate pieces of previous root hash information for comparison by using the specific Merkle tree including the pieces of previous node hash information for comparison included in each of the plurality of sets of previous node hash information, at a step of S134.

Thereafter, (i) each of the pieces of the previous root hash information for registration and each of the pieces of previous root hash information for comparison may be paired following their generation sequence and (ii) whether said each of the pieces of previous root hash information for registration is identical pair-wise to said each of the pieces of previous root hash information for comparison may be confirmed, to thereby complete the verification of whether the certificate stored in the authentication-managing server 200 is forged or not, at a step of S135.

Further, if said one of the anchoring conditions is met, the authentication-managing server 200 may retrieve from the certificate DB 211 a predetermined cardinal number of pieces of node hash information included in a specific Merkle tree having the specific node hash information for registration, where the predetermined cardinal number is determined by said one of the anchoring conditions, and may generate specific root hash information for registration by using the specific Merkle tree including the predetermined cardinal number of pieces of node hash information as the specific tree structure, at a step of S140.

Thereafter, the authentication-managing server 200 may instruct its transaction-processing engine 230 to generate (i) specific transaction information including the specific root hash information for registration and (ii) a specific transaction ID to be used as a key value for searching for the specific transaction information, and transmit the specific transaction information to the blockchain nodes 300, at a step of S150.

The blockchain nodes 300 may store the specific transaction information about the certificate in the blockchain at a step of S160.

Then, the transaction-processing engine 230 of the authentication-managing server 200 may transmit the specific transaction ID to the FI terminal 100, at a step of S170.

The FI terminal 100 may store the transmitted specific transaction ID in the verification DB 212, at a step of S180.

Thereafter, the client device 400 may transmit the download request for the certificate to the FI terminal 100, at a step of S190.

The FI terminal 100 may transmit the certificate and its corresponding specific transaction ID to the client device 400 as requested, at a step of S200.

The client device 400 may transmit the certificate, its corresponding specific transaction ID, and the client identification information to the authentication-managing server 200, to thereby request the verification of whether the certificate is forged or not, at a step of S210.

The authentication-managing server 200 may (i) determine whether the certificate is forged or not, based on the transmitted certificate, the transmitted specific transaction ID, and the transmitted client identification information, (ii) generate the verification-related information, and (iii) allow the verification-related information to be transmitted to the client device 400, at a step of S220.

Herein, the process of generating the verification-related information is as follows.

First, if the certificate and the specific transaction ID are received, the authentication-managing server 200 may transmit the specific transaction ID to the blockchain nodes 300, to thereby request the transmission of the specific transaction information, at a step of S221.

The blockchain nodes 300 may acquire the specific transaction information from the blockchain by referring to the specific transaction ID, and may transmit the specific transaction information to the authentication-managing server 200, at a step of S222.

The authentication-managing server 200 may (i) generate specific node hash information for comparison by hashing a data group comprised of the client identification information and the certificate transmitted from the client device 400, (ii) compare (ii-1) the specific node hash information for registration included in the specific transaction information transmitted from the blockchain nodes 300 and (ii-2) the specific node hash information for comparison, and (iii) generate verification-related information representing whether the two pieces of respective specific node hash information at the step (ii) are identical to each other, at a step of S223.

The client device 400 may be provided with valid financial documents by confirming the authenticity through displaying of the transmitted certificate, at a step of S230.

Meanwhile, there may be a possibility of leakage of confidential documents because various information on the certificates issued by the financial institutions is transmitted to the authentication-managing server 200 for the verification of their authenticity.

To prevent this leakage from happening, another example embodiment of the present invention is provided.

Figure 7:
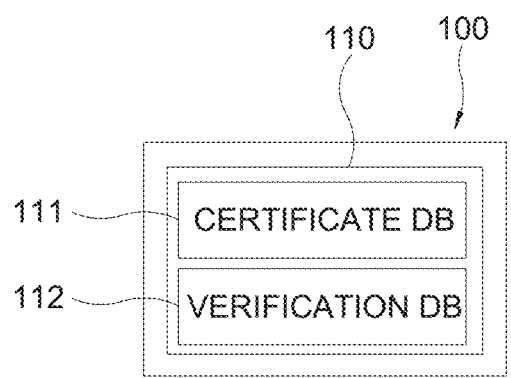
FIG. 7 is a block diagram illustrating the FI terminal of another example embodiment of the system for verifying whether the certificate is forged or not based on the blockchain in accordance with the present invention.
Figure 8:
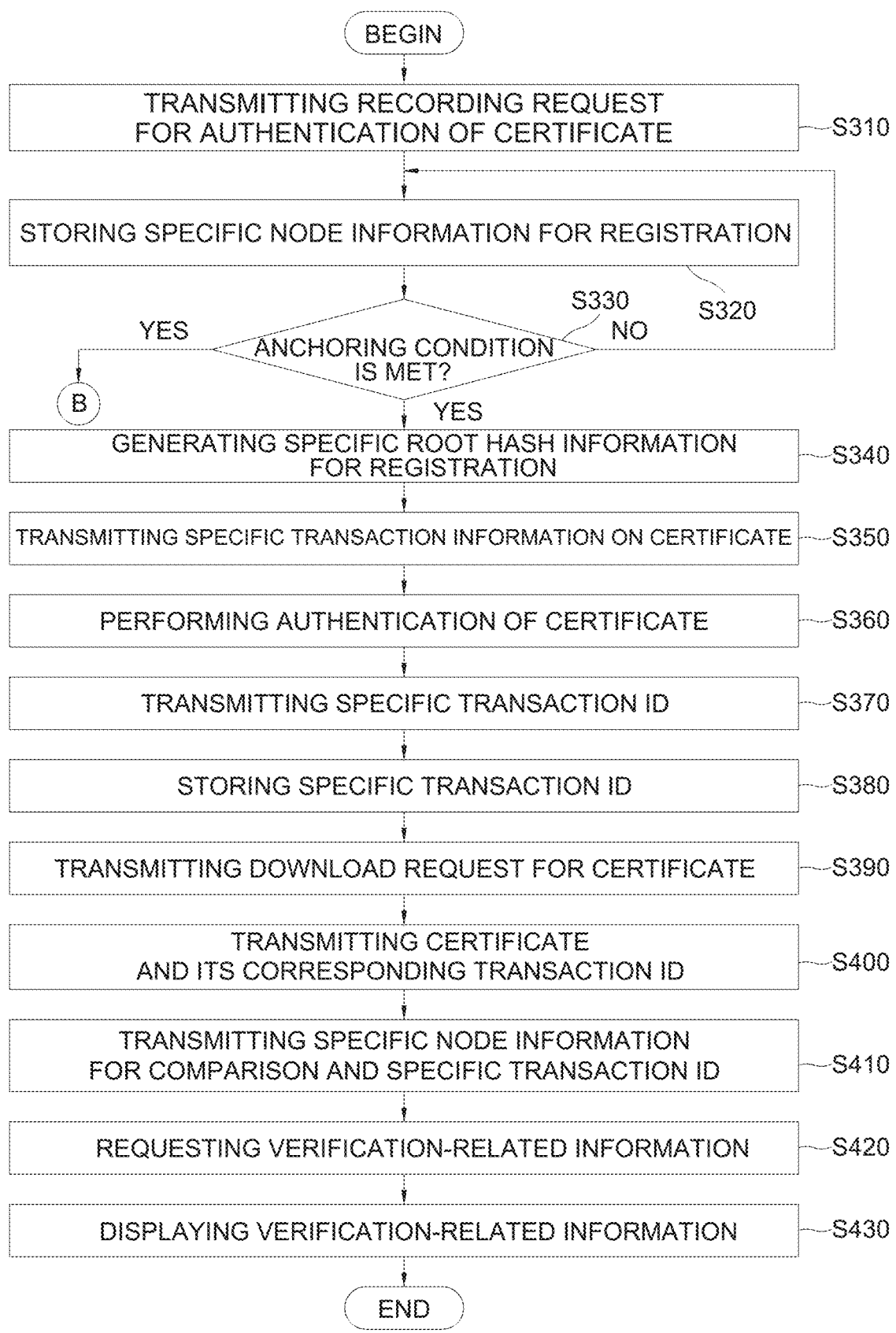
FIGS. 8 to 10 are flow charts illustrating a process of verifying whether the certificate issued from the financial institution is forged or not by using another example embodiment of the system for verifying whether the certificate is forged or not based on the blockchain in accordance with the present invention.
Figure 9:
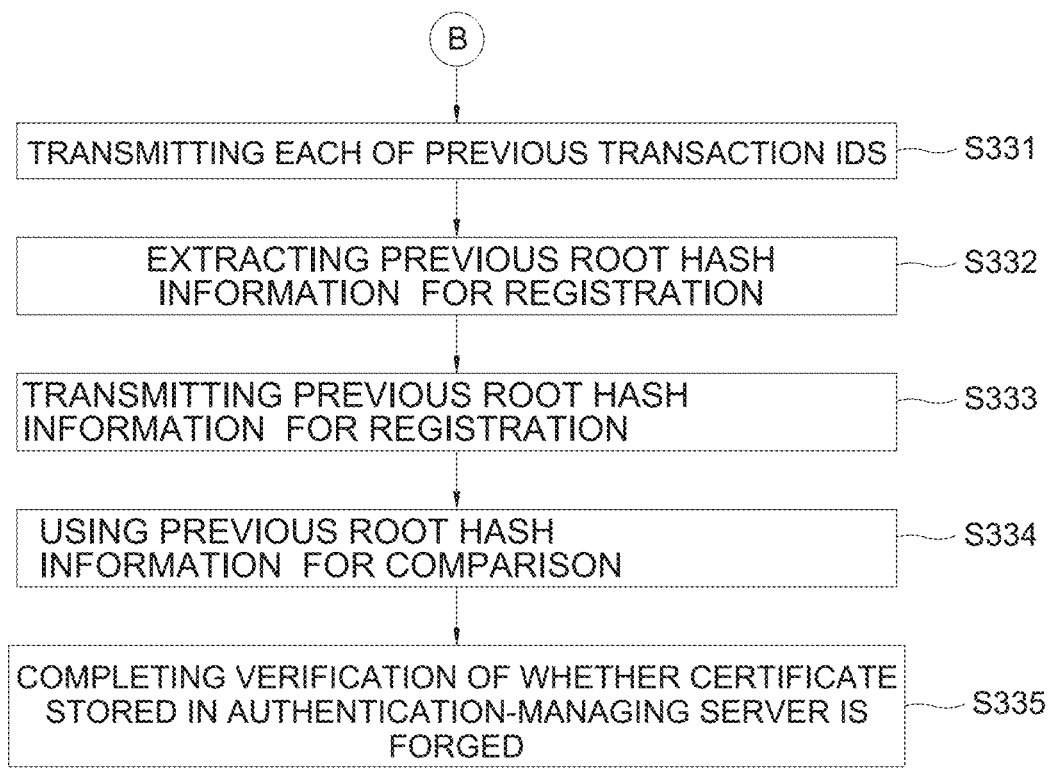
Figure 10:
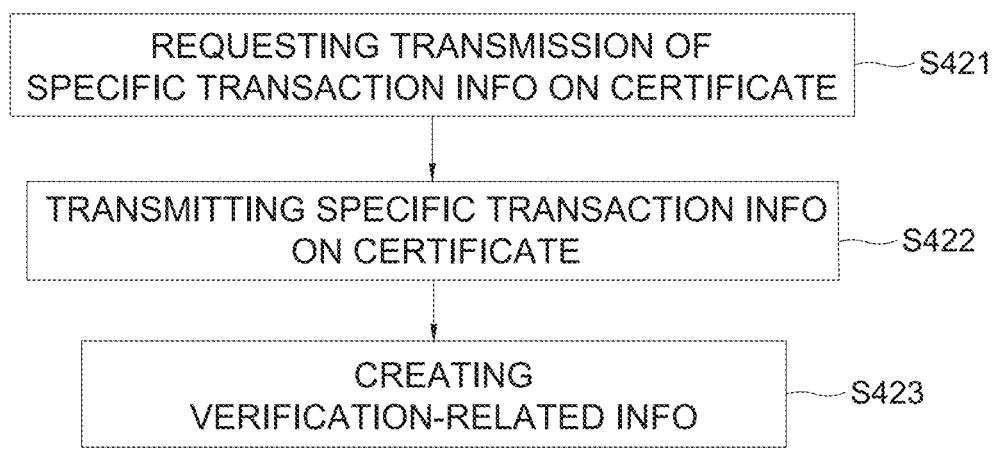

FIG. 7 is a block diagram illustrating the FI terminal of the system based on the blockchain in accordance with said another example embodiment of the present invention, and FIGS. 8 to 10 are flow charts illustrating a process of verifying authenticity of the certificate issued from the financial institution by using the system based on the blockchain in accordance with said another example embodiment of the present invention.

Herein, although the FI terminal 100, the authentication-managing server 200, the blockchain nodes 300, and the client device 400, which are included in the technical configuration in accordance with the aforementioned example embodiment, are the same, their internal composition and operational architecture may be partly different. Further, like numerals refer to the same or similar functionalities throughout the several views, and the details in accordance with said another example embodiment of the present invention are disclosed below.

First, the FI terminal 100 may perform a process of the verification of the authenticity without transmitting the certificate to the authentication-managing server 200.

By this process, if the certificate is generated, the FI terminal 100 may generate specific node hash information for registration by using the certificate and the client identification information, may transmit a recording request for the authentication of the certificate, may store a specific transaction ID transmitted in response to the recording request, transmit the certificate and the specific transaction ID if a download of the certificate is requested, and if the client device 400 requests the download of the certificate, may transmit the certificate and the specific transaction ID to the client device 400.

Further, if the certificate and the specific transaction ID are transmitted from the FI terminal 100 in response to the request sent to the FI terminal 100 for the download of the certificate, then the client device 400 may (i) generate specific node hash information for comparison by hashing a data group comprised of the certificate and the client identification information, and (ii) transmit the specific node hash information for comparison and the specific transaction ID to the authentication-managing server 200.

Thus, the difference is that the authentication-managing server 200 may (i) determine whether the certificate is forged or not based on the transmitted specific node hash information for comparison, and the transmitted specific transaction ID, (ii) generate the verification-related information which represents whether the certificate is forged or not, and (iii) allow the verification-related information to be transmitted to the client device 400.

The description of processes of verifying the authenticity of the certificate based on the blockchain in accordance with said another example embodiment of the present invention is as follows.

First, if the certificate is generated, the FI terminal 100 may generate specific node hash information for registration by hashing a data group comprised of the certificate and the client identification information, and transmit the specific node hash information for registration to the authentication-managing server 200 at the time of the recording request for the authentication of the certificate, at a step of S310.

The authentication-managing server 200 may store the transmitted specific node hash information for registration in the certificate DB 211, at a step of S320.

Herein, the authentication-managing server 200 may repeat confirming of whether any of the anchoring conditions is met, at a step of S330, and if one of the anchoring conditions is met, may perform two processes.

First, if said one of the anchoring conditions is met, the authentication-managing server 200 may extract all of previous transaction IDs that have been stored in the verification DB 212 before said one of the anchoring conditions is met, and transmit each of the previous transaction IDs to the blockchain nodes 300, at a step of S331.

The blockchain nodes 300 may retrieve pieces of previous root hash information for registration included in pieces of previous transaction information retrieved from the blockchain by referring to said each of the previous transaction IDs at a step of S332, and transmit the pieces of previous root hash information for registration to the authentication-managing server 200, at a step of S333.

The authentication-managing server 200 may receive the pieces of previous root hash information for registration, may group pieces of previous node hash information for comparison, that have been stored in the certificate DB 211 before said one of the anchoring conditions is met, into a plurality of sets whose size is determined by said one of the anchoring conditions, to thereby generate pieces of previous root hash information for comparison by using the specific Merkle tree including the pieces of previous node hash information for comparison included in each of said sets, at a step of S334.

Thereafter, (i) each of the pieces of the previous root hash information for registration and each of the pieces of previous root hash information for comparison following their generation sequence may be paired, (ii) whether said each of the pieces of previous root hash information for registration is identical pair-wise to said each of the pieces of previous root hash information for comparison may be confirmed, to thereby complete the verification of whether the certificate stored in the authentication-managing server 200 is forged or not, at a step of S335.

Further, if said one of the anchoring conditions is met, the authentication-managing server 200 may retrieve from the certificate DB 211 a predetermined cardinal number of pieces of node hash information included in a specific Merkle tree having the specific node hash information for registration, where the predetermined cardinal number is determined by said one of the anchoring conditions, and may generate specific root hash information for registration by using the specific Merkle tree including the predetermined cardinal number of pieces of node hash information, at a step of S340.

Thereafter, the authentication-managing server 200 may instruct its transaction-processing engine 230 to generate (i) specific transaction information including the specific root hash information for registration and (ii) a specific transaction ID to be used as a key value for searching for the specific transaction information, and transmit the specific transaction information to the blockchain nodes 300, at a step of S350.

The blockchain nodes 300 may store the specific transaction information about the certificate in the blockchain at a step of S360.

Then, the transaction-processing engine 230 of the authentication-managing server 200 may transmit the specific transaction ID to the FI terminal 100, at a step of S370.

The FI terminal 100 may store the transmitted specific transaction ID, at a step of S380.

Thereafter, the client device 400 may transmit a download request for the certificate to the FI terminal 100, at a step of S390.

The FI terminal 100 may transmit the certificate and its corresponding specific transaction ID to the client device 400 as requested, at a step of S400.

The client device 400 may generate specific node hash information for comparison by hashing a data group comprised of the transmitted certificate and the client identification information, and transmit the generated specific node hash information for comparison and the specific transaction ID to the authentication-managing server 200 at the time of a verification request for verifying whether the certificate is forged or not, at a step of S410.

The authentication-managing server 200 may (i) determine whether the certificate is forged or not based on the transmitted specific node hash information for comparison, and the transmitted specific transaction ID, (ii) generate verification-related information which represents whether the certificate is forged or not, and (iii) allow the verification-related information to be transmitted to the client device 400, at a step of S420.

Herein, the process of generating the verification-related information is as follows.

If the specific node hash information for comparison and the specific transaction ID are received, the authentication-managing server 200 may transmit the specific transaction ID to the blockchain nodes 300, to thereby request a transmission of the specific transaction information, at a step of S421.

The blockchain nodes 300 may acquire the specific transaction information from the blockchain by referring to the specific transaction ID, and may transmit the specific transaction information to the authentication-managing server 200, at a step of S422.

The authentication-managing server 200 may (i) compare (i-1) the specific node hash information for registration included in the specific transaction information transmitted from the blockchain nodes 300 and (i-2) the specific node hash information for comparison, and (ii) generate verification-related information representing whether the two pieces of respective specific node hash information at the step (i) are identical to each other, at a step of S423.

The client device 400 may display the verification-related information, at a step of S430.

The present invention has an effect of accurately verifying the authenticity of the certificate issued from the financial institution by comparing the certificate initially issued from the financial institution and the certificate re-issued later at the request of the client, without regard to whether its watermark is verified or not, and further reducing the cost for registration of the certificate based on the blockchain.

The present invention has another effect of minimizing network overload by reducing network traffic through registering pieces of information on the certificate which are grouped and compressed, according to a quantity, expressed as a cardinal number, of pieces of information of the certificate predetermined by a system administrator, when registering transaction information including the information on the certificate in a process of registering the certificate based on the blockchain.

The present invention has still another effect of monitoring possible forgery of the certificate for client caused by illegal activities like hacking, by periodically verifying whether the certificate for client stored in the financial institutions is forged or not.

What is claimed:

1. A method for verifying whether a certificate of a financial institution (FI) is forged or not based on a blockchain, comprising:
   receiving, by an authentication-managing server, a request for recording a certificate including the certificate and client identification information from a financial institution (FI) terminal;
   performing, by the authentication-managing server, operations of storing a pair of the certificate and the client identification information in a certificate database (DB), generating specific node hash information for registration by hashing the pair, and storing the specific node hash information for registration in the certificate DB;
   confirming, by the authentication-managing server, whether an anchoring condition is met;
   performing, by the authentication-managing server, under a condition that the anchoring condition is met, operations of retrieving from the certificate DB a predetermined quantity of pieces of node hash information including the specific node hash information for registration, the predetermined quantity being expressed as a predetermined cardinal number, wherein the predetermined quantity is determined by the anchoring condition, and generating specific root hash information for registration by using a specific Merkle tree including the predetermined quantity of pieces of node hash information;
   performing, by the authentication-managing server, operations of generating specific transaction information including the specific root hash information for registration, generating a specific transaction ID to be used as a key value for searching for the specific transaction information, and transmitting the transaction information to blockchain nodes as an instruction to the blockchain nodes to store the transaction information in a blockchain ledger so as to establish an authenticity of a registration of the certificate;
   transmitting, by the authentication-managing server, the specific transaction ID to the FI terminal;
   receiving, by the authentication-managing server, a request for verifying the certificate including the certificate, the specific transaction ID and the client identification information from a client device, the receiving being in response to the client device having sent a request for the certificate to the FI terminal and receiving the certificate and the specific transaction ID from the FI terminal; and
   performing, by the authentication-managing server, processes of (i) generating specific node hash information for comparison by hashing the certificate and the client identification information received from the client device, (ii) generating verification-related information which represents whether the specific node hash information for comparison is identical to the specific node hash information for registration, and (iii) transmitting the verification-related information to the client device.

2. The method of claim 1, wherein the anchoring condition includes at least one of (i) a numeric condition of determining whether the specific Merkle tree includes the predetermined quantity of said pieces of node hash information, and (ii) a temporal condition of determining whether a predetermined amount of time has elapsed since a last anchoring condition was met.

3. The method of claim 1, wherein, after confirming whether the anchoring condition is met, by the authentication-managing server, the method further comprises:
   performing, by the authentication-managing server, under the condition that the anchoring condition is met,
      extraction of any previous transaction IDs that have been stored in a verification DB, and
      transmission of each of the any previous transaction IDs to the blockchain nodes;
   instructing the blockchain nodes to (i) extract pieces of previous root hash information for registration included in pieces of previous transaction information wherein the pieces of the previous transaction information are retrieved from the blockchain ledger by referring to each of the any previous transaction IDs and (ii) transmit the pieces of previous root hash information for registration to the authentication-managing server;
   receiving, by the authentication-managing server, the pieces of previous root hash information for registration, and grouping pieces of previous node hash information for comparison with the pieces of the previous root hash information for registration, wherein the pieces of previous node hash information for comparison have been stored in the certificate DB, so as to group the pieces of previous node hash information for comparison into a plurality of sets whose size is determined by the anchoring condition, so as to generate pieces of previous root hash information for comparison by hashing the pieces of previous node hash information for comparison of said plurality of sets; and
   performing, by the authentication-managing server, processes of (i) pairing each of the pieces of the previous root hash information for registration and each of the pieces of previous root hash information for comparison according to generated sequences of each of the pieces of the previous root hash information for registration and each of the pieces of previous root hash information for comparison, and (ii) confirming that said each of the pieces of previous root hash information for registration is identical pair-wise to said each of the pieces of previous root hash information for comparison, to thereby complete a verification of whether the certificate stored in the authentication-managing server is forged or not.

4. The method of claim 1, wherein the authentication-managing server further inserts the specific root hash information for registration in an Operation Code RETURN area of the specific transaction information and transmits the specific transaction information, and wherein the Operation Code RETURN represents that its transaction information is not a monetary transaction related to a cryptocurrency payment.

5. The method of claim 4, wherein the blockchain nodes, under a condition that the Operation Code RETURN area of the specific transaction information transmitted from the authentication managing server is determined to have the specific root hash information for registration, allow the specific transaction information to be stored in the blockchain ledger.

6. The method of claim 1, wherein the generating the verification-related information includes processes of:
  transmitting, by the authentication-managing server, under a condition that the certificate and the specific transaction ID are received, the specific transaction ID to the blockchain nodes;
  instructing the blockchain nodes to (i) retrieve the specific transaction information from the blockchain ledger by referring to the specific transaction ID and (ii) transmit the specific transaction information to the authentication-managing server; and
  performing, by the authentication-managing server, processes of (i) generating the specific node hash information for comparison by hashing a data group comprised of the client identification information and the certificate transmitted from the client device (ii) comparing the specific node hash information for registration included in the specific transaction information transmitted from the blockchain nodes and the specific node hash information for comparison, and (iii) creating the verification-related information representing whether the specific node hash information for registration and the specific node hash information for comparison are identical to each other and indicative that the certificate is forged if the two pieces of respective specific node hash information are not identical to each other.

* * * * *